(12) United States Patent
Sasaki et al.

(10) Patent No.: US 6,299,361 B1
(45) Date of Patent: Oct. 9, 2001

(54) METHOD OF MAKING AN OPTICAL FIBER ARRAY AND APPARATUS FOR MAKING AN OPTICAL FIBER ARRAY

(75) Inventors: Takashi Sasaki; Teruaki Nishida; Hidetoshi Ishida; Dai Yui; Kei Sunaga, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/391,387

(22) Filed: Sep. 8, 1999

(30) Foreign Application Priority Data

Sep. 9, 1998  (JP) .................................................. 10-255542

(51) Int. Cl.$^7$ ...................................................... G02B 6/38
(52) U.S. Cl. .................................. 385/59; 385/58; 385/65
(58) Field of Search .................................. 385/59, 65, 71, 385/56, 57, 58, 60, 61, 62, 63, 64, 66, 67, 83

(56) References Cited

U.S. PATENT DOCUMENTS 6,045,269 * 4/2000 Watanabe et al. ..................... 385/59

FOREIGN PATENT DOCUMENTS

| 63-163406 | 7/1988 | (JP) . |
| 9-68629 | 3/1997 | (JP) . |
| 9-230158 | 9/1997 | (JP) . |
| 10-90554 | 4/1998 | (JP) . |
| 10-288723 | 10/1998 | (JP) . |

OTHER PUBLICATIONS

"16–Core Wavelength–Type Coupler with a Built–in Filter (16–Arrayed Coupler and Filter Hybrid)", by Oguchi et al., Paper C–335, Spring meeting of the institute of Electronics Information and Communication engineers, 1994.

"Manufacture of PLC–Type Highly–Dense Duplex 2X16 Splitter Modules", by Takagi et al., Paper C–3–15, General meeting of the Institute of electronics, Information and Communication engineers, 1997.

* cited by examiner

*Primary Examiner*—Hung Xuan Dang
(74) *Attorney, Agent, or Firm*—McDermott, Will & Emery (57) ABSTRACT

The invention has an object to provide a method of making an optical fiber array in which bare fibers obtained by removing a coating of an optical fiber ribbon can be certainly arrayed on a V-groove substrate. A first feature of the invention is to use a positioning guide, and the positioning guide is provided with a recess portion having inclined wall surfaces, and its bottom portion is made to have a width equal to the whole width of the bare fibers in an arrayed state. By using this positioning guide, the optical fiber array can be made in a process as follows. In a state where bare fibers exposed by removing part of coating of tip portions of two fiber ribbons are alternately arranged, the positioning guide is raised from below. The bare fibers with irregular gaps are moved by the positioning guide and are arranged. In this state, the bare fibers are pressed by a fiber pressing member from above, and the V-groove substrate is raised, so that they are put on V grooves and are fixed by an adhesive.

9 Claims, 7 Drawing Sheets

METHOD OF MAKING AN OPTICAL FIBER ARRAY AND APPARATUS FOR MAKING AN OPTICAL FIBER ARRAY

BACKGROUND OF THE INVENTION

The present invention relates to a method of making an optical fiber array used for connecting optical fibers to an optical device such as an optical waveguide, and particularly to a method of making an optical fiber array in which bare fibers are fixed on a V-groove substrate.

Figure 12A:
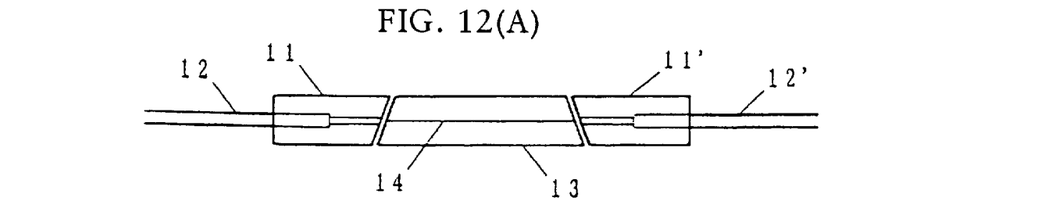
FIGS. 12A and 12B are explanatory views of an example in which an optical fiber array is connected to an optical waveguide.
Figure 12B:
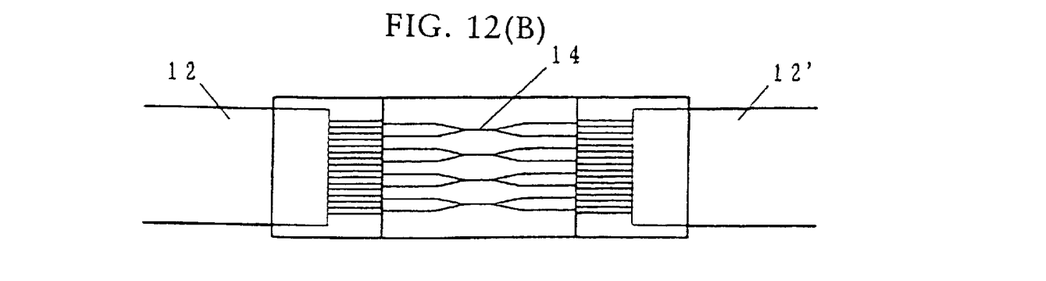

In techniques for connecting optical fibers to an optical device such as an optical waveguide, there is known a method in which connection is made by using an optical fiber array. FIGS. 12A and 12B are views for explaining an example in which an optical fiber array is comprised of optical fibers of a fiber ribbon, and the optical fibers are connected to optical waveguides. FIG. 12A is a side view and FIG. 12B is a plan view. The optical waveguides and optical fibers inside a waveguide chip and the optical fiber array are shown by thin lines. In the drawings, reference numerals 11 and 11' designate optical fiber arrays, 12 and 12' designate eight-core fiber ribbons, 13 designates an optical waveguide chip, and 14 designates an optical waveguide. Both end faces of the optical waveguide chip 13 are polished so that they are inclined by 8° with respect to a plane vertical to an optical axis of the optical waveguide, and the optical waveguide chip 13 and the optical fiber arrays 11 and 11' are aligned and are bonded to each other. In the optical waveguide chip 13, four pairs of couplers are formed by the optical waveguides 14, and eight ports of the couplers at both sides are coupled to the fiber ribbons 12 and 12' of the optical fiber arrays 11 and 11' at both sides, respectively.

Figure 13:
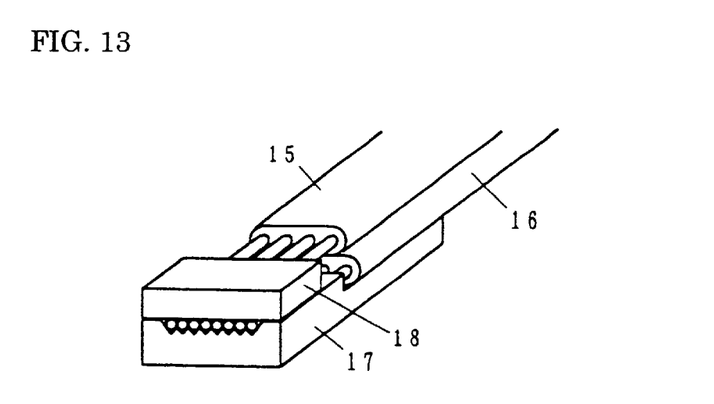
FIG. 13 is a perspective view of an example of an optical fiber array in which two fiber ribbons are overlapped and are used.

Increase in density, namely, increase in the number of fibers and decrease in volume,has been required for such an optical fiber array. A perspective view of FIG. 13 shows an example of an optical fiber array disclosed in a paper C-335 by Oguchi, et al, p. 4–332, Spring meeting of the Institute of Electronics, Information and Communication engineers, 1994, paper C-3-15 by Takagi, et al, p. 200, General meeting of the Institute of electronics, Information and communication engineers, 1997, Japanese Patent Unexamined Publication No. Hei. 9-68629, and Japanese Patent Unexamined Publication No. Hei. 9-230158. In the drawing, reference numerals 15 and 16 designate fiber ribbons, 17 designates a V-groove substrate, and 18 designates a fiber pressing member. The coating of tip portions of the two fiber ribbons 15 and 16 are removed so that the optical fibers of the fiber ribbons are made to be bare fibers, the fiber ribbons overlap each other while being shifted by half of an arrangement pitch of the optical fibers in the fiber ribbon, the bare fibers are disposed on the V-groove substrate 17 so that they are alternately arranged, the bare fibers are held by the fiber pressing member 18, and they are fixed by an adhesive. After adhesion, the end face is obliquely polished so that it makes an angle of, for example, 8° with respect to a plane vertical to an optical axis of an optical waveguide.

Figure 14:
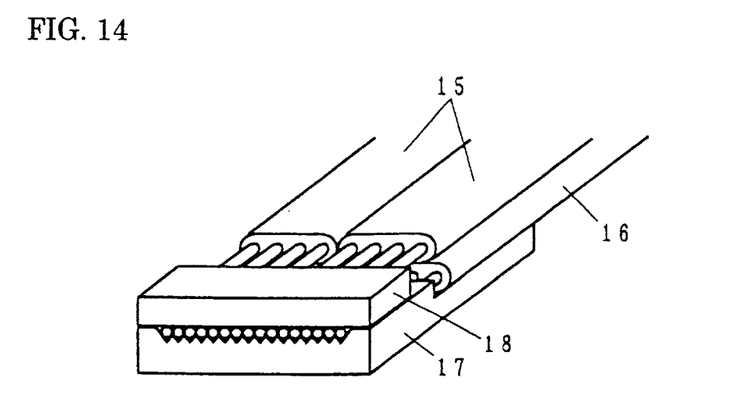
FIG. 14 is a perspective view of an example of an optical fiber array with a structure in which two optical fiber arrays of FIG. 13 are arranged in parallel.

FIG. 14 shows a state where two optical fiber arrays of FIG. 13 are arranged in parallel, and two pairs of two fiber ribbons overlapped up and down with respect to the V-groove substrate 17 are used. In the above paper C-3-15 by Takagi, et al, p. 200, General meeting of the Institute of electronics, Information and communication engineers, 1997, an optical fiber array of this structure is illustrated.

In the manufacture of such an optical fiber array, a V-groove substrate is used so as to accurately position and arrange bare fibers. If the V-groove substrate is not used but the bare fibers are arranged on a flat plate, fluctuations in the diameter of the bare fibers accumulate, so that a disadvantage is apt to occur especially when a plurality of bare fibers are arranged.

If the V-groove substrate is used and bare fibers are set in predetermined grooves, although an optical fiber array with an accurate pitch is obtained, the operation of arranging the bare fibers and setting them in the predetermined V grooves is difficult. The operation is more difficult in a case of a high density optical fiber array in which two fiber ribbons overlap each other. This point will be explained with reference to FIG. 15.

Figure 15:
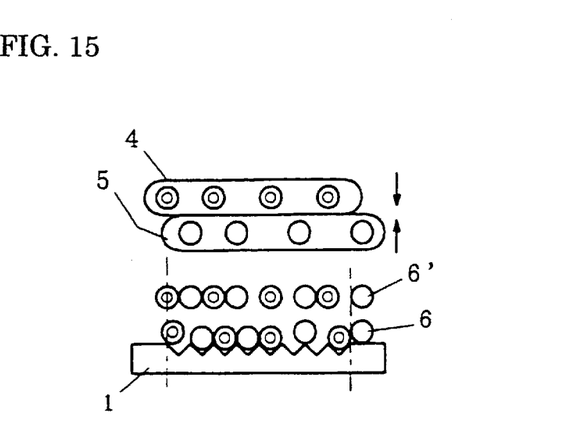
FIG. 15 is an explanatory view of a conventional method of making an optical fiber array.

The coating of the tip portions of the two fiber ribbons 4 and 5 are removed so that bare fibers are exposed, and they are overlapped up and down with respect to V-groove substrate 1 while being shifted by a half pitch of an arrangement pitch of optical fibers in the fiber ribbon as shown in the uppermost figure of FIG. 15. The respective bare fibers of the two fiber ribbons are alternately arranged as shown in the middle figure of FIG. 15.

However, the bare fibers of the tip portions of the two fiber ribbons 4 and 5 are not necessarily arranged at an equal interval because of a slight deviation of a tape fiber and a shift in arrangement after removal of the common coating. In the drawing, they are shown irregularly with exaggeration. Because of such irregularity, electrostatic force, and the like, the alternately arranged bare fibers are not necessarily arranged in a close contact state. Rather, as shown by bare fibers 6', it is common that they are arranged in an irregular state. Thus, when the bare fibers 6' are arranged on the V-groove substrate 1, as shown by bare fibers 6, there appears a bare fiber which does not fall in the V groove.

Besides, after the bare fibers of one of the fiber ribbons are set in every other V groove, the bare fibers of the other fiber ribbon cannot be appropriately set in the remaining vacant grooves therebetween, since the bare fibers of the tip portions of the two fiber ribbons 4 and 5 are not necessarily separated at an even interval.

Further, since the outer diameter of a bare fiber is normally made 125 $\mu$m, when the pitch of V grooves is made 125 $\mu$m, the V grooves become shallower than those with 250 $\mu$m pitch of a normal optical fiber array. Thus, it becomes more difficult to set the bare fibers in predetermined V grooves.

Thus, if there are attempts to automate this operation, a handling mechanism of an optical fiber for that requires accuracy of several $\mu$m or less, and becomes expensive.

Further, since a bare fiber and a bare fiber are very close to each other, it is also difficult to recognize the set state of the bare fibers, and even if the set state is recognized, it is also difficult to correct that to correct that manually and it is more difficult to automate the correction thereof Incidentally, the term "up and down" does not mean up and down in a positional relation with respect to the direction of the force of gravity, but up and down in a positional relation seen from the V-groove substrate. Thus, in the case where the V-groove substrate is placed horizontally, two fiber ribbons are placed in an up and down positional relation with respect to the direction of the force of gravity. The term "up and down" in the claims is also used with the same meaning.

The reason why an assembling technique of an optical fiber array has not been completed is that as described above, it is difficult to arrange bare fibers in V grooves.

Incidentally, although Japanese Patent Unexamined Publication No. Sho. 63-163406 discloses an example in which bare fibers are arrayed by using an optical fiber arraying member, this technique is such that the sides of bare fibers arranged on a flat plate are pushed so that the bare fibers are laterally shifted on the plane to be arrayed. In the case where the V-groove substrate is used, after a bare fiber is once set in some V groove, it is difficult to shift the fiber laterally. Thus, it is impossible to use a method disclosed in Japanese Patent Unexamined Publication No. Sho. 63-163406 for the purpose of arranging the bare fibers by using the V-groove substrate.

SUMMARY OF THE INVENTION

The present invention has been made in view of the foregoing circumstances, and an object of the invention is to ensure the arrangement of bare fibers on a V-groove substrate and to make an optical fiber array.

A method of making an optical fiber array according to the present invention is characterized in that a coating of a tip portion of optical fibers is removed so that bare fibers are exposed, and the bare fibers are arrayed by a positioning guide and then the arrayed bare fibers are fixed on a V-groove substrate as they are.

By this, the irregular positions of the bare fibers is corrected, and the fibers can be arrayed in fixing grooves with excellent reproducibility.

As for the optical fiber, a fiber ribbon in which a plurality of optical fibers are integrated with a common coating to form a tape-like shape may be used. In this case, the fiber ribbons are overlapped up and down, respective bare fibers of the upper and lower fiber ribbons are put to vertically cross each other so as to be alternately arranged, and then the bare fibers are laid and fixed on the V-groove substrate in the state where the tip portions of the bare fibers are arrayed by the positioning guide.

By this, the expansion of the bare fibers is suppressed, the bare fibers are fixed to predetermined fixing grooves with excellent reproducibility, and an optical fiber array with high density can be made.

The tip positions of the bare fibers of the upper and lower fiber ribbons are detected, and the positions of the upper and lower fiber ribbons are adjusted on the basis of this, and then, the tip portions of the bare fibers may be made to vertically cross each other to be alternately arrayed.

By this, the physical contact between the bare fibers during assembling of the optical fiber array can be minimized, and the optical fiber array comprising optical fibers having high mechanical strength can be obtained.

Further, the positions of roots of the bare fibers and the position of the V-groove substrate are also detected, and the bare fibers may be arranged on the V-groove substrate in the state where the positions of the upper and lower fiber ribbons are adjusted so that the bare fibers become parallel to the V-grooves on the extensions of the V-grooves.

By this, it becomes possible to automatically assemble an optical fiber array entirely.

An apparatus for making an optical fiber array according to the present invention comprises:

means for holding a fiber ribbon;

means for holding a V-groove substrate;

a positioning guide;

means for detecting positions of bare fibers and said V-groove substrate;

means for obtaining an amount of movement from said positions; and means for calculating an amount of movement of said means for holding said fiber ribbon and an amount of movement of said means for holding said V-groove substrate.

By this, bare fibers can be fixed to predetermined fixing grooves with excellent reproducibility and an optical fiber array with high density can be automatically made, and the optical fiber array with high mechanical strength can be obtained.

The above and further objects and novel features of the invention will be more fully clarified from the following detailed description when the same is read in connection with the accompanying drawing. It is to be expressly understood, however, that the drawing is for the purpose of illustration only and is not intended as a definition of the limits of the invention.

BRIEF DESCRIPTION OF THE DRAWING

FIGS. 8A to 8F are explanatory views of a process of an arrayed state of bare fibers in a fourth embodiment of a method of making an optical fiber array according to the present invention. The right side of each of FIGS. 8C to 8E is a plan view of overlapped fiber ribbons (the lower fiber ribbon is shown by a one-dot-chain line), the left side thereof is a plan view of a V-groove substrate.

DESCRIPTION OF THE PREFERRED EMBODIMENT

Figure 1:
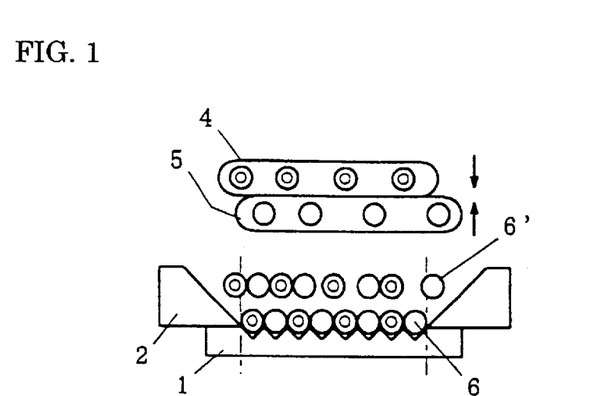
FIG. 1 is an explanatory view of an arraying method of optical fibers for explaining a first embodiment of a method of making an optical fiber array according to the present invention.

FIG. 1 shows an arranging method of a first embodiment of the invention using a positioning guide. In the drawing, reference numeral 1 designates a V-groove substrate, 2 designates a positioning guide, 4 and 5 designate fiber ribbons, and 6 and 6' designate bare fibers. For the purpose of distinction of the drawing plain, the upper bare fibers 6' are shown with double circles. As is understood also from FIG. 2, a positioning guide 2 is provided with a recess portion having inclined wall surfaces such that an opening is wider than a bottom width, and the size of the bottom is determined so as to become equal to the whole width of bare fibers in an arrayed state. A positioning guide 3 presses the bare fibers toward the bottom of the recess portion of the positioning guide 2.

Figure 2:
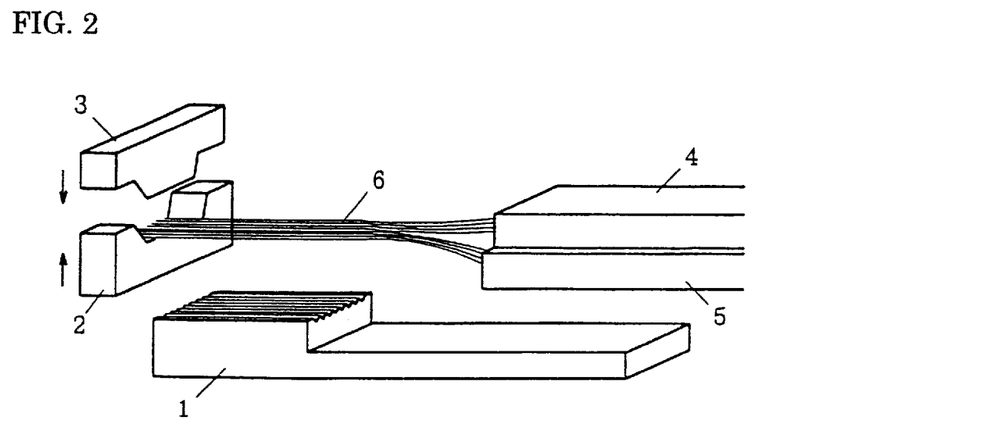
FIG. 2 is an explanatory view of a method of making an optical fiber array using the positioning guide of FIG. 1. In the drawing, reference numeral 1 designates a V-groove substrate, 2 and 3 designate positioning guides, 4 and 5 designate fiber ribbons, and 6 designates bare fibers.

In order to array bare fibers, as shown in FIG. 2, part of the coating of each of the tip portions of two fiber ribbons 4 and 5 is removed, resulting in exposed bare fibers 6, and in a state where the respective bare fibers of fiber ribbon 4 and those of fiber ribbon 5 are alternately arranged, the positioning guide 2 is raised from below, and the positioning guide 3 is moved downward. Since these movements are relative, only one of the positioning guides may be moved.

Thus, the bare fibers arranged with irregular gaps are moved by the inclined surfaces of side walls of the recess portion of the positioning guide 2, so that they are confined within the range of the interval of the bottom of the positioning guide 2. As a result, they are arrayed as shown by the bare fibers 6 of FIG. 1. In order to avoid the breaking of the bare fibers, it is necessary not to excessively enlarge the pressing force of the positioning guide 3.

In this state, the V-groove substrate 1 and the bare fibers 6 are relatively moved, the bare fibers 6 are put on V-grooves of the V-groove substrate 1, and the bare fibers 6 are fixed to the V-groove substrate 1 by a suitable method, for example, the bare fibers are bonded to the V-groove substrate 1 in a state where the bare fibers 6 are pressed to the V-grooves by using a not-shown fiber pressing member, so that an optical fiber array is made.

In order to relatively move the V-groove substrate 1 and the bare fibers 6, the V-groove substrate 1 may be raised, or the holding member of the two fiber ribbons 4 and 5 and the positioning guides 2 and 3 may be moved downward together.

Figure 3:
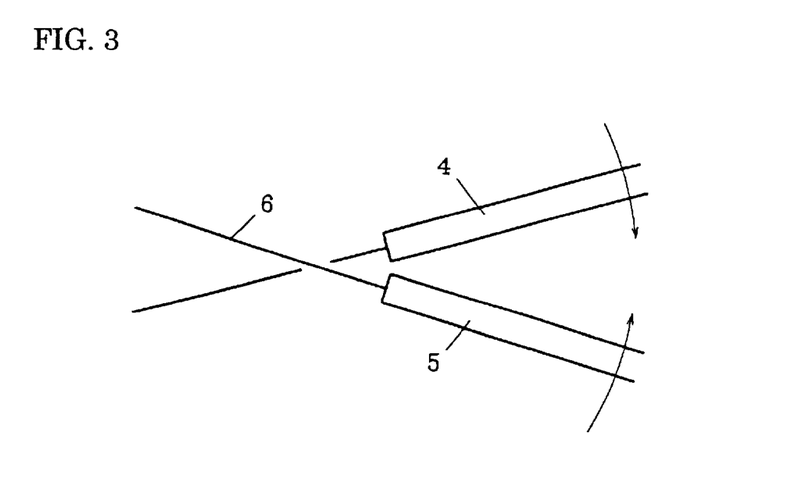
FIG. 3 is an explanatory side view of an example of a method of alternately arranging the respective fibers of two fiber ribbons.

FIG. 3 shows an example of a method of alternately arranging the respective fibers 6 of the two fiber ribbons 4 and 5. In the state where the coating of the end portions of the two fiber ribbons 4 and 5 are removed to expose the bare fibers 6, as shown in FIG. 3, if the fiber ribbons 4 and 5 are put so that the respective bare fibers 6 vertically cross each other at about their root portions, it is possible to alternately arrange the respective bare fibers 6 of the two fiber ribbons 4 and 5 easily.

Figure 4:
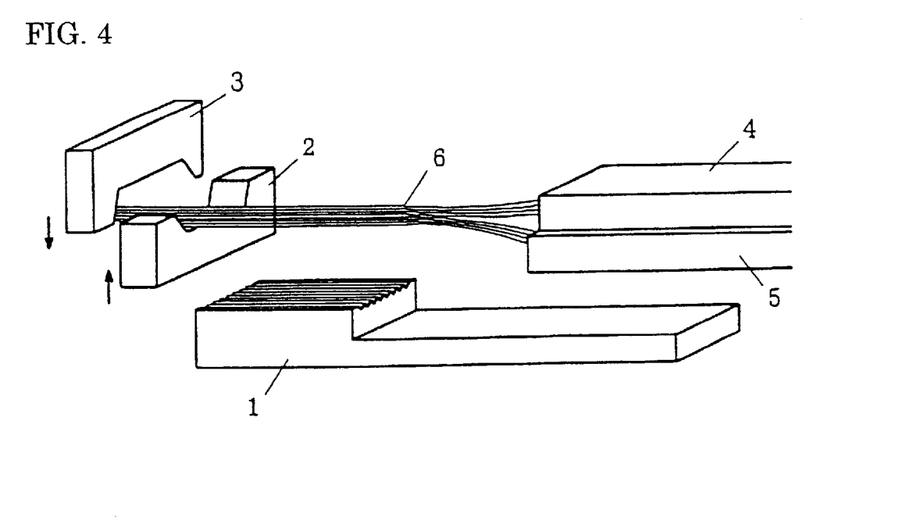
FIG. 4 is an explanatory view of a second embodiment of a method of making an optical fiber array according to the present invention.
Figure 5A:
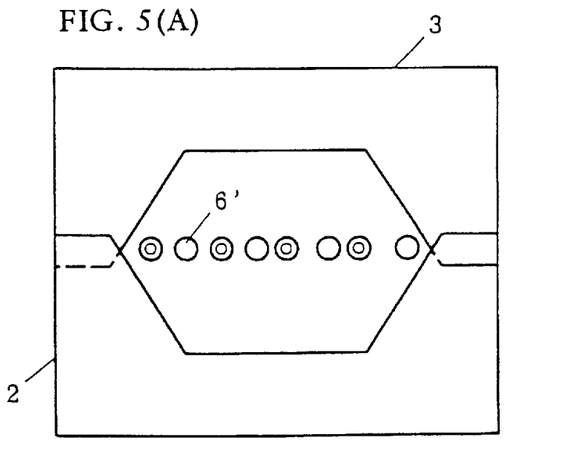
FIGS. 5A and 5B are explanatory views of a positioning guide in the embodiment of FIG. 4.
Figure 5B:
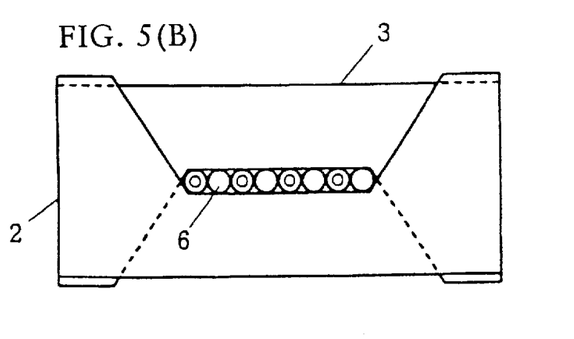

FIGS. 4, 5A and 5B are explanatory views for explaining a second embodiment of a method of making an optical fiber array of the invention. In the drawings, the same portions as those of FIGS. 1 and 2 are designated by the same reference numerals, and their explanation will be omitted. In this embodiment, positioning guides 2 and 3 are different from those of the embodiment described in FIGS. 1 and 2. As shown in FIGS. 5A and 5B, both the positioning guides 2 and 3 include recess portions each having inner walls inclined such that the bottom portion is narrower than the opening portion. Both the recess portions may have the same shape and size as the positioning guide 2 described in FIGS. 1 and 2.

As shown in FIG. 5A, with respect to bare fibers 6' arranged in an irregular state, the two positioning guides 2 and 3 are brought into contact so as to rub each other, and the positioning guides 2 and 3 are moved so that the bare fibers are put between the two positioning guides 2 and 3. As a result, the bare fibers 6 can be arrayed as shown in FIG. 5B. A fixing method of the arrayed bare fibers 6 to the V-groove substrate is the same as the fixing method in the first embodiment described in FIG. 1 and FIG. 2. In this embodiment, the inclined surfaces of the recess portions of both the positioning guides 2 and 3 move the bare fibers from the right and left, and the bottom portions of the recess portions press the bare fibers from above and below, so that the bare fibers can be arrayed while being guided.

FIGS. 6A to 6D are explanatory views for explaining a third embodiment of a method of making an optical fiber array of the invention. In the drawings, the same portions as those of FIG. 2 are designated by the same reference numerals and their explanation will be omitted. FIGS. 6A to 6D are views for explaining a process of arraying bare fibers. The right side of each drawing is a side view and the left side of each view is a front view of a positioning guide (front view is omitted in FIG. 6D). Reference numerals 2, 3a and 3b designate positioning guides.

In this embodiment, the positioning guides 3a and 3b functioning to press the bare fibers in the up and down direction, that is, from the direction orthogonal to the arrangement plane of the bare fibers, and the positioning guide 2 functioning to move the bare fibers in the horizontal direction along the arrangement plane, that is, from both sides of the arrangement direction of the bare fibers are structured by different members. The positioning guide 2 is provided with a recess portion, and inclined surfaces are formed at both sides of the recess portion. This recess portion may have the same shape and size as the recess portion of the positioning guide 2 described in FIGS. 1 and 2.

Figure 6A:
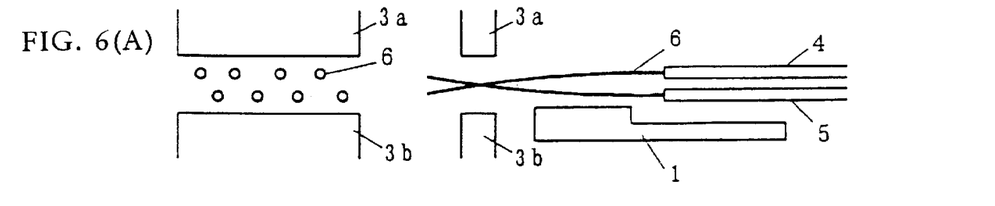
FIGS. 6A to 6D are explanatory views of a third embodiment of a method of making an optical fiber array according to the present invention.

FIG. 6A shows a state in which coating of the tip portions of the fiber ribbons 4 and 5 are removed so that the bare fibers 6 are exposed. Although the respective bare fibers of the fiber ribbons 4 and 5 are placed to be alternately positioned, as explained in FIG. 3, respective bare fibers of the upper and lower fiber ribbons are put to vertically cross each other so as to be alternately arranged.

Figure 6B:
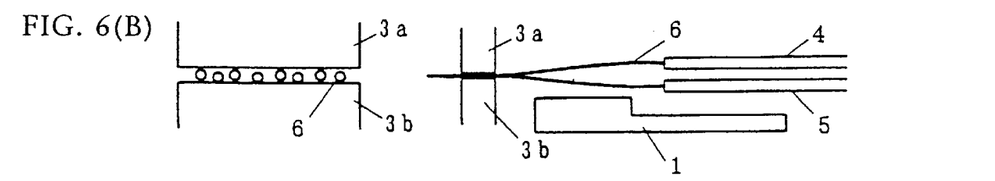

Next, as shown in FIG. 6B, the positioning guides 3a and 3b press the bare fibers while holding the bare fibers from above and below. The pressing of the bare fibers by the positioning guides 3a and 3b is carried out with moderate strength. Since it is necessary to allow movement of the bare fibers 6 in the pressed state, pressing of the bare fibers 6 is carried out in such a manner that an interval larger than the outer diameter of the bare fiber 6 is maintained between the positioning guides 3a and 3b. However, if such interval is too large, the arrangement of the alternately arranged bare fibers 6 is disturbed, so that the interval of the positioning guides 3a and 3b is smaller than a value twice the outer diameter of the bare fiber 6. In the case where the outer diameter of the bare fiber 6 is made 125 μm, it is preferable that the interval of the positioning guides 3a and 3b in a pressing state is at a degree such that it is larger than 125 μm and less than 150 μm. Through pressing by the positioning guides 3a and 3b, the bare fibers 6 are arranged almost on the same plane.

Figure 6C:
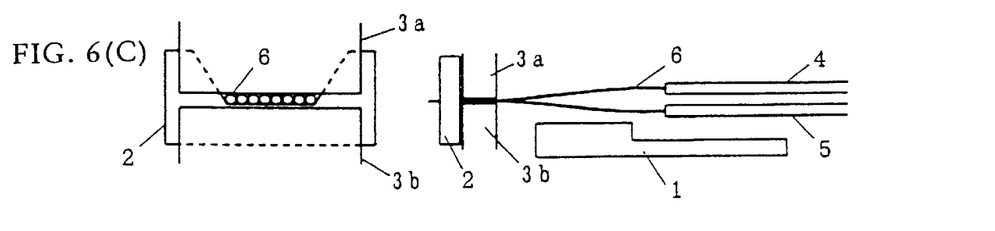
Figure 6D:
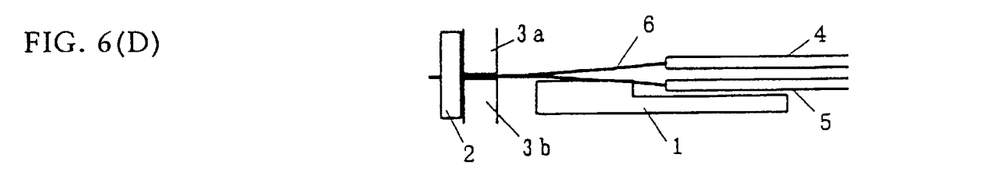

Intervals between the bare fibers 6 are regulated. As shown in FIG. 6C, the positioning guide 2 is raised. The bare fibers 6 are moved by the inclined surfaces at both sides of the recess portion of the positioning guide 2, so that adjacent bare fibers are arranged to be brought into almost close contact, and the intervals between the bare fibers 6 are made uniform.

In this state, the arranged bare fibers 6 are made to go down so as to be positioned on the V-groove substrate 1. The V-groove substrate 1 may be raised. By the relative movement of the bare fibers 6 and the V-groove substrate 1, the bare fibers 6 can be arranged on individual V grooves of the V-groove substrate 1.

Figure 7:
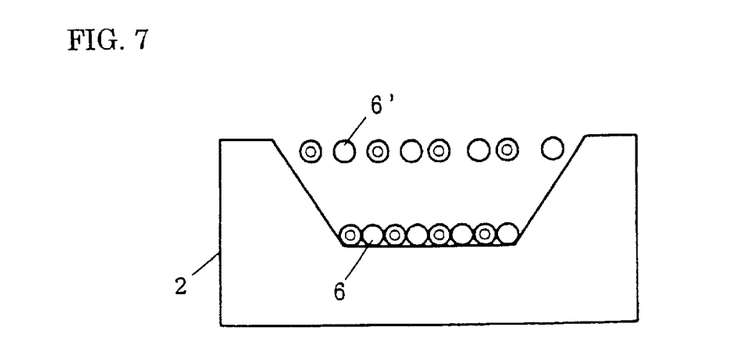
FIG. 7 is an explanatory view of a positioning guide in the embodiment of FIG. 6.

FIG. 7 is an explanatory view of an operation of the positioning guide. When the positioning guide 2 is relatively moved to the bare fibers 6' placed at uneven intervals, they are moved through the inclined surfaces and the intervals can be unified as indicated by the bare fibers 6. Incidentally, the positioning guide 2 is not limited to the use of the inclined surfaces. Since the bare fibers have only to be moved, a mechanism for holding the bare fibers between two guides from both sides may be used like the positioning guides 3a and 3b described in FIGS. 6A to 6D.

In a fourth embodiment shown in FIGS. 8 to 11, arraying of bare fibers is carried out through image processing, and is basically the same as the process described in FIGS. 6A to 6D.

Figure 8A:
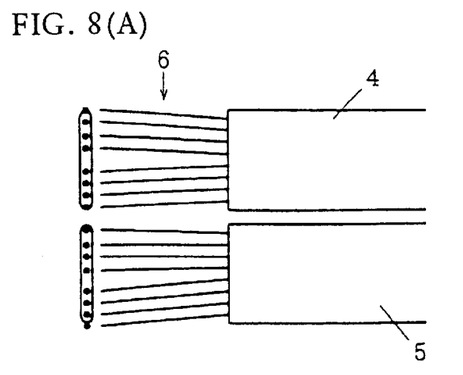

FIG. 8A shows a state in which a coating with a predetermined length at the tip portion of each of fiber ribbons 4 and 5 is removed so that bare fibers 6 are exposed. The respective fiber ribbons 4 and 5 in which the bare fibers 6 are exposed, are held by holding means capable of obtaining position information, for example, holding means capable of detecting an amount of three-dimensional movement as digital data. A suitably determined initial position is made a standard, and a movement amount or deviation amount of the fiber ribbons 4 and 5 is obtained as position information with digital data.

Figure 9:
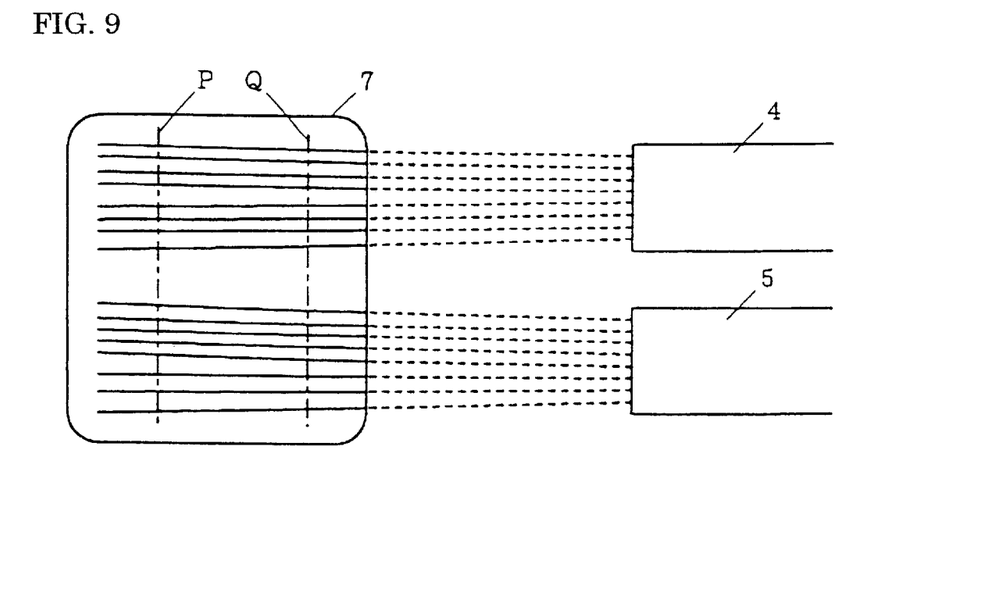
FIG. 9 is an explanatory view of image processing in a fourth embodiment of a method of making an optical fiber array according to the present invention. Reference numeral 7 designates a display screen.

An image of the bare fibers of the fiber ribbons held by the holding means is taken by image pickup means. FIG. 9 shows an example of the image pickup means. In this example, part of the bare fibers is displayed on the basis of the image pickup data by using a display screen of a CCD monitor, and image processing is performed at two positions so that observed data are taken. Two observation positions are indicated by a P line and a Q line. On the basis of the observed data, data of the position of the holding means with respect to the position of the CCD, the length m of the bare fiber, and the length n from the observation position P to the tip of the bare fiber, arithmetic processing is carried out, to obtain position information of the tip position and root position of each bare fiber. In the drawing, although a plurality of fiber ribbons are observed at the same time, they may be observed separately. As described later, from the time of this observation to the time when the bare fibers are set in V-grooves of the V-groove substrate, the holding state of the fiber ribbons held by the holding means is maintained. Thus, the position information of the fiber ribbons at the time of image pickup may be used as the initial position standard mentioned above. Besides, the tip position of a specific bare fiber may be used as the initial position standard.

From the position information of the tip of each bare fiber based on the results of the arithmetic processing described above, intervals as shown in FIG. 10A, a1, a2, a3, . . . and b1, b2, b3, . . . of the tips of the respective bare fibers in two fiber ribbons 4 and 5 can be calculated. This operation result enables the determination of an amount of moving the holding means to shift two fiber ribbons so that the tip portions of the respective bare fibers of the two fiber ribbons are alternately arranged. For example, in FIG. 10B, in the case where the fiber ribbon 4 disposed at the upper side is shifted to the right with respect to the position of the tip of the bare fiber 5a at one end of the fiber ribbon 5 disposed at the lower side, on the precondition that the tips of the bare fibers 4a to 4g are respectively positioned between the tips of the bare fibers 5a to 5h, an amount of movement is determined so that dispersion of all intervals becomes minimum. The intervals are intervals of adjacent centers of the tips of the upper and lower bare fibers, for example, an interval seen in orthogonal projection (orthogonal projection to the arrangement plane of the bare fibers) of the tips of the bare fibers 4a and 5a, an interval seen from orthogonal projection of the tips of the bare fibers 4a and 5b, and so on. Incidentally, in the case where the foregoing precondition cannot be achieved, the tip portions of the bare fibers of the upper and lower fiber ribbons cannot be arrayed, and the case is made an error.

Figure 8B:
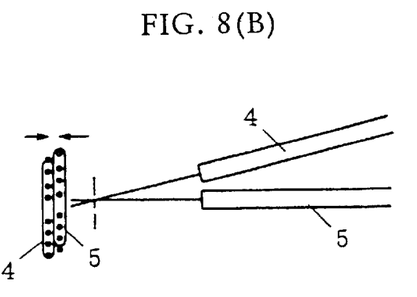
Figure 10A:
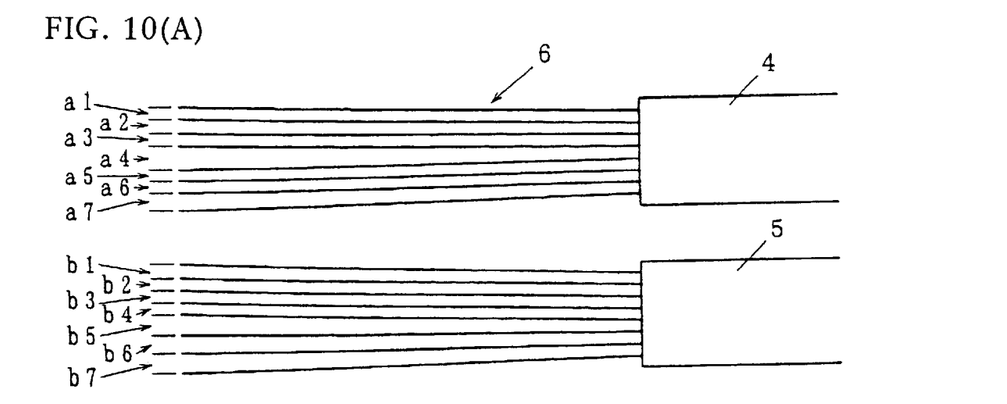
FIGS. 10A and 10B are explanatory views of the state of tip portions of bare fibers in the fourth embodiment of the method of making the optical fiber array according to the present invention.
Figure 10B:
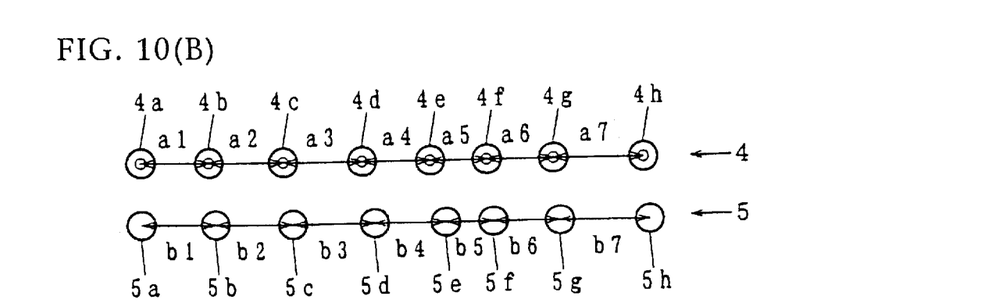
Figure 11A:
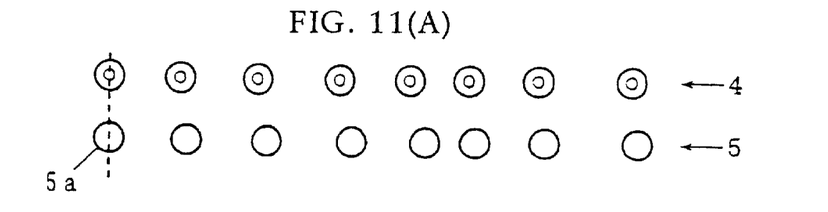
FIGS. 11A to 11D are explanatory views of the arrayed state of the tip portions of the bare fibers in the fourth embodiment of the method of making the optical fiber array according to the present invention.
Figure 11B:
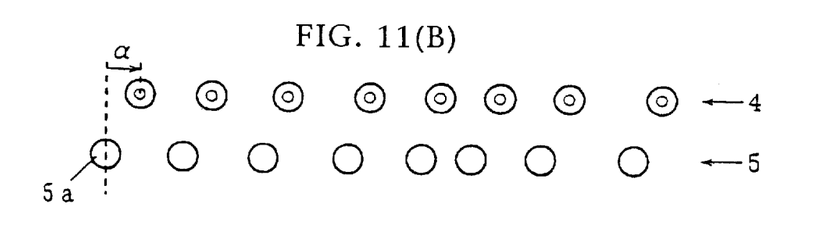
Figure 11C:
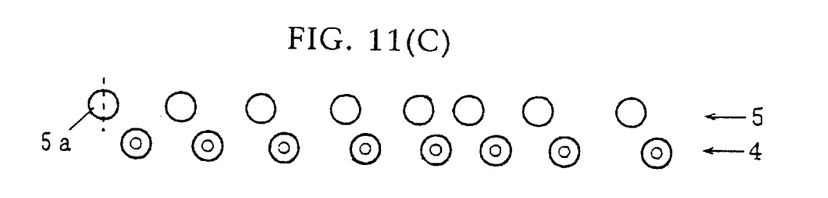

FIG. 11A is a view showing the tips of the bare fibers shown in FIG. 10B. Like the foregoing example, the holding means is driven to give a movement amount α to the upper fiber ribbon 4 with respect to the position of the tip of the bare fiber 5a as the standard position, so that, as shown in FIG. 11B, the tips of the upper and lower bare fibers are alternately disposed (in the case where the tips of the upper and lower bare fibers cannot be alternately arranged even if the movement amount α is changed, the case is made an error as described above). Next, as shown in FIG. 8B, the holding means is driven to relatively incline the upper and lower fiber ribbons 4 and 5 (for example, a cross angle of 8 to 10°), so that the tip portions of the bare fibers are made to approximate each other as shown in FIG. 11C, and the tip portions of the bare fibers are arrayed.

Figure 8C:
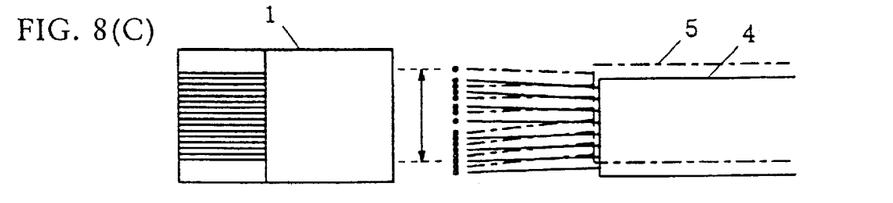

FIG. 8C is a view showing the arrayed state seen on a plane. In this state, the position of each bare fiber does not correspond to the position of each V-groove of the V-groove substrate 1.

Figure 8D:
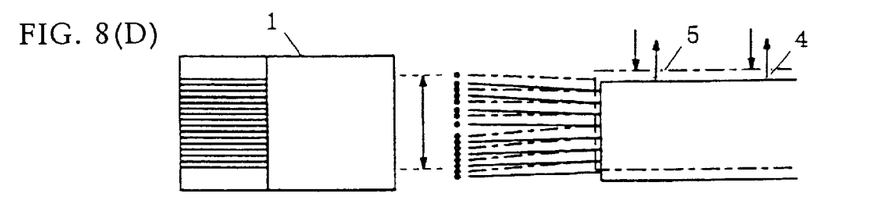

Then, as shown in FIG. 8D, on the basis of the data of the root positions of the bare fibers 5a, the lower fiber ribbon 5 is moved so that the roots of the bare fibers of the lower fiber ribbon 5 to be set are positioned on the extensions of the respective V grooves of the V-groove substrate 1. The upper fiber ribbon 4 is also moved in the same manner.

Figure 8E:
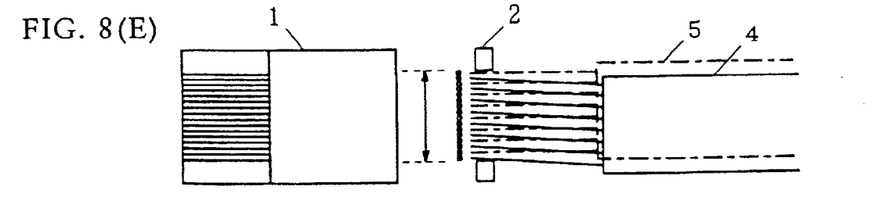
Figure 11D:
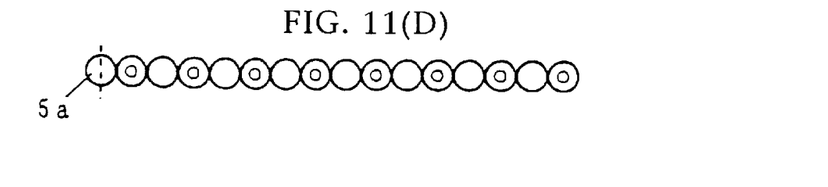

FIG. 8E shows an arraying step of the tip portions of the bare fibers. By using the positioning guide as described in the first to third embodiments, the tip portions of the bare fibers are closely arrayed as shown in FIG. 11D. In order to cause the tip portions of the bare fibers arrayed by the positioning guide 2 to coincide with the V grooves of the V-groove substrate 1, the position where the V-groove substrate 1 is set relative to the bare fibers may be made to correspond to the position of the positioning guide.

By the steps of FIGS. 8D and 8E, the fiber ribbon 4 and the fiber ribbon 5 become a state such that they overlap together from the tip to the root at the position shifted by about a half pitch. Either step of FIGS. 8D and 8E may be performed first.

Figure 8F:
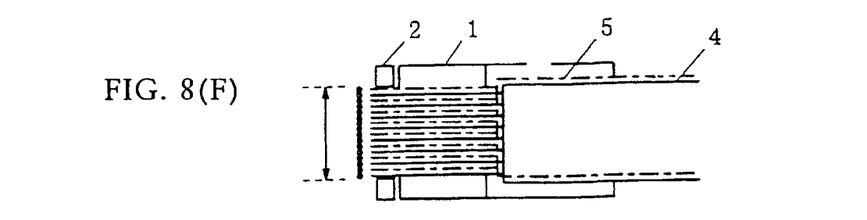
FIG. 8F shows a state where the fiber ribbons are put on the V-groove substrate.

Finally, as shown in FIG. 8F, the fiber ribbons 4 and 5 and the V-groove substrate 1 are relatively moved, so that the bare fibers can be positioned on the V grooves.

In the fourth embodiment described in FIGS. 8 to 11, after the bare fibers are made to vertically cross each other, the lower fiber ribbon is moved and the root positions of the bare fibers are adjusted. However, the root positions of the bare fibers may be adjusted after the upper fiber ribbon is first moved. Besides, adjustment of the root positions of the upper and lower fiber ribbons may be carried out after the positions of the tip portions of the bare fibers are adjusted by the positioning guide.

The root positions of the bare fibers in the respective fiber ribbons are not necessarily arranged at completely equal intervals. Besides, in the removing operation of coating, a case can also occur where the root positions of the bare fibers are changed. Thus, as described above, as in the case where the fiber ribbon 5 is moved with the bare fiber 5a as a standard, or the case where the fiber ribbon 4 is moved with the bare fiber 4a as a standard, when a fiber ribbon is moved with the root position of one bare fiber in the fiber ribbon as a standard, there is a case where an amount of movement is not necessarily suitable. Thus, after the root positions of the bare fibers in the. fiber ribbons 4 and 5 are calculated, according to the fluctuation of intervals of the root positions, the standard position of the respective fiber ribbons may be determined by arithmetic processing such as calculation of a mean value or least-square method.

It can be also said to be desirable that the movement of the fiber ribbons 4 and 5 is made such that the bare fibers of the upper and lower fiber ribbons 4 and 5 become parallel to the V grooves of the V-groove substrate 1. However, as described above, the positions of the roots of the bare fibers in the respective fiber ribbons are not necessarily arranged at an equal interval and at the same pitch completely equivalent to the outer diameter of the bare fiber, and the outer diameter of the bare fiber also has tolerance. Thus, in order to prevent the bare fibers automatically set in the V grooves from receiving external damage at the time of setting of the fibers, they may be set over the whole length of the V grooves in parallel to the V grooves.

In the first to fourth embodiments, although the description has been made on the method of making an optical fiber array using two fiber ribbons, the invention is not limited to this. As shown in FIG. 14, pairs of fiber ribbons overlapped up and down are arranged in parallel and an optical fiber array using four fiber ribbons may be made, and further, the number of pairs arranged in parallel may be increased. Further, the invention is not limited to the case where the fiber ribbons are overlapped together, but one fiber ribbon may be used. In that case, the pitch of V grooves is twice that of the foregoing embodiments. Even in the structure where one fiber ribbon is used, a plurality of fiber ribbons may be arranged in parallel.

Besides, in the first to fourth embodiments, although the description has been made on the method of making an optical fiber array using two fiber ribbons, the optical fiber used in the invention is not limited to the fiber ribbon, but a single core fiber may be used. Thus, in the present specification, the term "optical fiber" includes a fiber ribbon and a single core fiber.

What is claimed is:

1. A method of making an optical fiber array in which a plurality of bare fibers are arranged and fixed on a V-groove substrate, the method comprising the following steps in the order named:

removing coating of a tip portion of optical fibers to expose said bare fibers;

arraying tip portions of said bare fibers by a positioning guide;

arranging said bare fibers on said V-groove substrate; and fixing said bare fibers to said V-groove substrate.

2. A method according to claim 1, wherein said positioning guide presses said bare fibers in a direction orthogonal to an arrangement plane of said bare fibers so that said bare fibers are arranged on almost the same plane, and moves said bare fibers from both sides of said arrangement plane so that adjacent bare fibers are brought into almost close contact.

3. A method of making an optical fiber array in which fiber ribbons each including a plurality of optical fibers integrated into a tape-like shape with a common coating are overlapped up and down and bare fibers of said fiber ribbons are arranged and fixed on a V-groove substrate, the method comprising the following steps in the order named:

removing coating of tip portions of said fiber ribbons to expose said bare fibers;

arraying tip portions of said bare fibers by a positioning guide;

arranging said bare fibers on said V-groove substrate; and fixing said bare fibers to said V-groove substrate.

4. A method according to claim 3, further comprising the step of vertically crossing said bare fibers of each of said fiber ribbons at a place near the roots of said bare fibers so as to be arrayed together before said step of arraying said tip portions of said bare fibers by said positioning guide.

5. A method of making an optical fiber array in which fiber ribbons each including a plurality of optical fibers integrated into a tape-like shape with a common coating are overlapped up and down and bare fibers of said fiber ribbons are arranged and fixed on a V-groove substrate, the method comprising the steps of:

removing coating of tip portions of said fiber ribbons to expose said bare fibers;

vertically crossing said bare fibers of each of said upper and lower fiber ribbons so as to be arrayed together;

arraying tip portions of said bare fibers by a positioning guide;

adjusting positions of said fiber ribbons so that positions of roots of said bare fibers of each of said upper and lower fiber ribbons are shifted by half of an arrangement pitch of said optical fibers in said fiber ribbons;

arranging said bare fibers on said V-groove substrate; and fixing said bare fiber to said V-groove substrate.

6. A method according to claim 5, wherein in said step of adjusting positions of said fiber ribbons, said bare fibers of each of said upper and lower fiber ribbons and said V-groove substrate are observed, and based on the results thus observed, said position of each of said upper and lower fiber ribbons is adjusted.

7. A method of making an optical fiber array in which fiber ribbons each including a plurality of optical fibers integrated into a tape-like shape with a common coating are overlapped up and down and bare fibers of said fiber ribbons are arranged and fixed on a V-groove substrate, the method comprising the steps of:

removing coating of tip portions of said fiber ribbons to expose said bare fibers;

adjusting positions of said V-groove substrate and a positioning guide;

vertically crossing said bare fibers of each of said upper and lower fiber ribbons so as to be arrayed together;

arraying tip portions of said bare fibers by said positioning guide;

adjusting a position of each of said upper and lower fiber ribbons so that said bare fibers become parallel to V-grooves of said V-groove substrate;

arranging said bare fibers on said V-groove substrate; and fixing said bare fibers to said V-groove substrate.

8. A method of making an optical fiber array in which fiber ribbons each including a plurality of optical fibers integrated into a tape-like shape with a common coating are overlapped up and down and bare fibers of said fiber ribbons are arranged and fixed on a V-groove substrate, the method comprising the steps of:

removing coating of tip portions of said fiber ribbons to expose said bare fibers;

adjusting a position of each of said upper and lower fiber ribbons by observing said bare fibers of said upper and lower fiber ribbons and said V-groove substrate, by detecting tip positions of said bare fibers, root positions of said bare fibers, and a position of said V-groove substrate, and by using detected data as a basis;

vertically crossing said bare fibers of each of said upper and lower fiber ribbons so as to be arrayed together;

arraying tip portions of said bare fibers by a positioning guide;

adjusting a position of each of said upper and lower fiber ribbons so that said bare fibers become parallel to V grooves of said V-groove substrate;

arranging said bare fibers on said V-groove substrate; and fixing said bare fibers to said V-groove substrate.

9. An apparatus for making an optical fiber array in which fiber ribbons each including a plurality of optical fibers integrated into a tape-like shape with a common coating are overlapped up and down and bare fibers of said fiber ribbons are arranged and fixed on a V-groove substrate, the apparatus comprising:

means for holding said fiber ribbons;

means for holding said V-groove substrate;

a positioning guide;

means for detecting positions of said bare fibers and said V-groove substrate; and means for calculating an amount of movement of said means for holding said fiber ribbons and said means for holding said V-groove substrate from said positions.

* * * * *